(12) United States Patent
Naskar et al.

(10) Patent No.: US 9,441,113 B2
(45) Date of Patent: Sep. 13, 2016

(54) PYROLYTIC CARBON BLACK COMPOSITE AND METHOD OF MAKING THE SAME

(71) Applicant: UT-BATTELLE, LLC, Oak Ridge, TN (US)

(72) Inventors: Amit K. Naskar, Knoxville, TN (US); Mariappan Parans Paranthaman, Knoxville, TN (US); Zhonghe Bi, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 423 days.

(21) Appl. No.: 13/945,239

(22) Filed: Jul. 18, 2013

(65) Prior Publication Data

US 2015/0021525 A1    Jan. 22, 2015

(51) Int. Cl.
    *H01B 1/04*      (2006.01)
    *C09C 1/48*      (2006.01)
    *H01M 4/587*     (2010.01)
    *H01M 10/052*    (2010.01)
    *H01M 10/054*    (2010.01)

(52) U.S. Cl.
    CPC .............. *C09C 1/482* (2013.01); *H01M 4/587* (2013.01); *C01P 2004/04* (2013.01); *C01P 2006/12* (2013.01); *C01P 2006/40* (2013.01); *H01M 10/052* (2013.01); *H01M 10/054* (2013.01)

(58) Field of Classification Search
    CPC ..................... H01M 10/052; C01P 2006/40
    USPC ......................................... 252/502; 423/449.8
    See application file for complete search history.

(56) References Cited

U.S. PATENT DOCUMENTS

| | | | |
|---|---|---|---|
| 5,728,361 | A | 3/1998 | Holley |
| 5,744,668 | A | 4/1998 | Zhou et al. |
| 5,961,946 | A | 10/1999 | Takegawa et al. |
| 7,416,641 | B2 | 8/2008 | Denison |
| 7,497,929 | B2 | 3/2009 | Karpetsky et al. |
| 7,947,248 | B2 | 5/2011 | Hamby et al. |
| 7,993,780 | B2 | 8/2011 | Jang et al. |
| 2009/0136849 | A1 | 5/2009 | Yue et al. |
| 2012/0263641 | A1 | 10/2012 | Chung et al. |

FOREIGN PATENT DOCUMENTS

| | | | |
|---|---|---|---|
| CN | 101003695 | 7/2007 | |
| CN | 102214516 | 10/2011 | |
| CN | 102214516 A | * 10/2011 | ............ H01G 11/86 |
| FR | 2357616 | 2/1978 | |
| KR | 101147788 | 2/2012 | |
| WO | 0129150 | 4/2001 | |
| WO | 2011010323 | 1/2011 | |

OTHER PUBLICATIONS

Hummers et al., "Preparation of graphitic oxide", J Am Chem Soc (1958) 80(6): 1339.

(Continued)

*Primary Examiner* — Khanh Tuan Nguyen
(74) *Attorney, Agent, or Firm* — Fox Rothschild LLP

(57) ABSTRACT

A method of recovering carbon black includes the step of providing a carbonaceous source material containing carbon black. The carbonaceous source material is contacted with a sulfonation bath to produce a sulfonated material. The sulfonated material is pyrolyzed to produce a carbon black containing product comprising a glassy carbon matrix phase having carbon black dispersed therein. A method of making a battery electrode is also disclosed.

89 Claims, 12 Drawing Sheets

(56) References Cited

OTHER PUBLICATIONS

Lin et al., "Surface functional chracteristics (C, O, S) of waste tire-derived carbon black before and after steam activation", J Atr & Waste Manage. Assoc. (2008) 58: 78-84.

Tang et al., "Thermal plasma pyrolysis of used tires for carbon black recovery", Journal of Materials Science (2005) 40(14): 3817-3819.

Wojtowicz et al., "Carbon black derived from waste tire pyrolysis", Advanced Fuel Research, Inc. (n.d.). (7 pages).

* cited by examiner

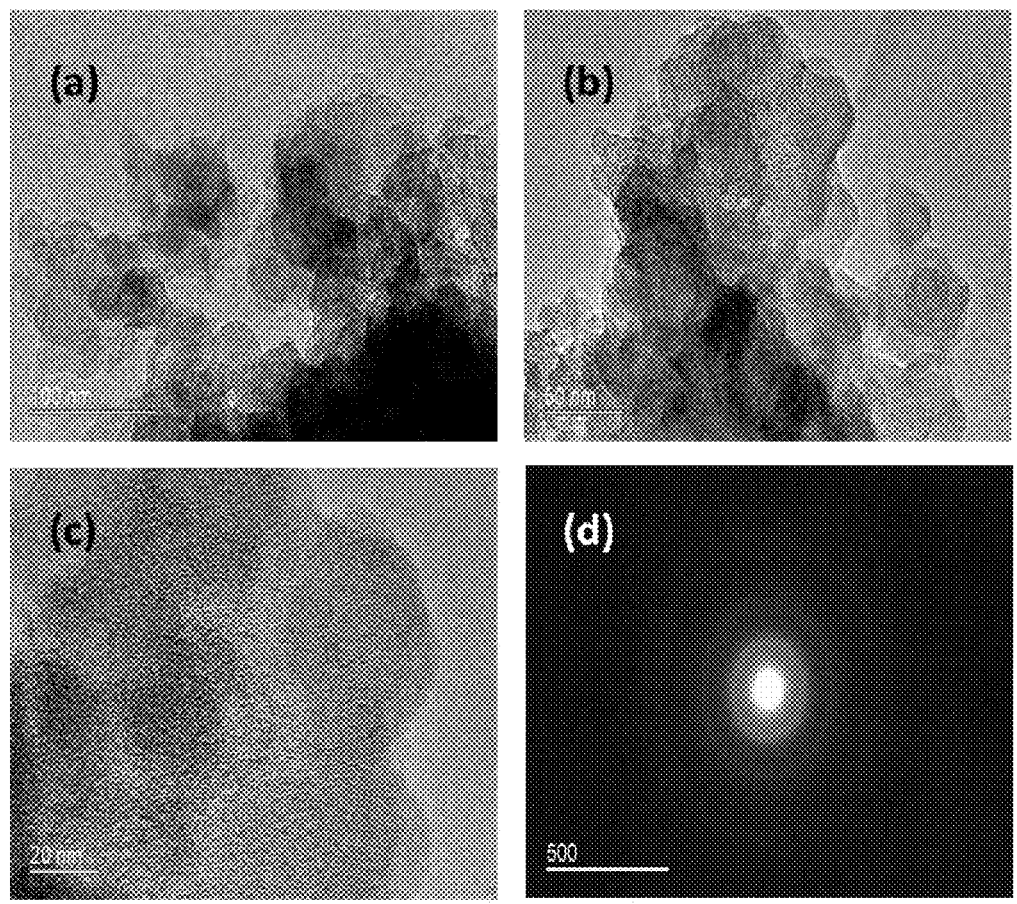
FIGURES 10 (a) – (d)

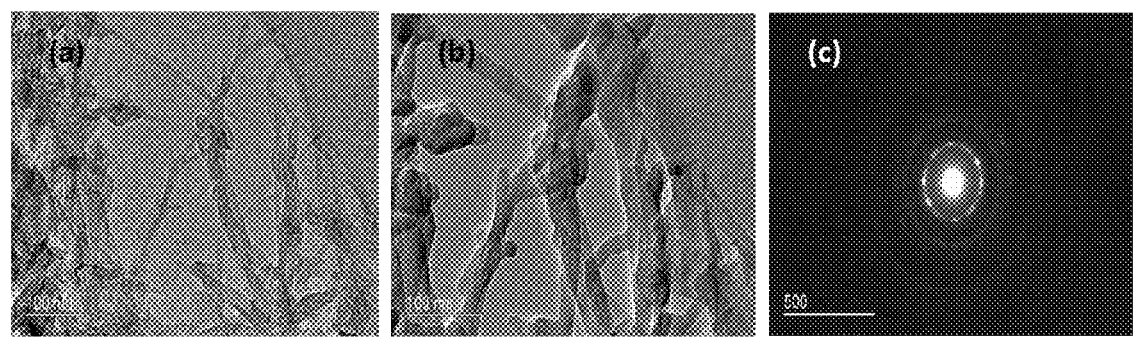
FIGURES 11 (a) – (c)

PYROLYTIC CARBON BLACK COMPOSITE AND METHOD OF MAKING THE SAME

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates generally to producing materials containing carbon particles, and more specifically to the production of materials containing carbon particles for battery electrodes.

BACKGROUND OF THE INVENTION

Worn rubber tires in the past were sent to landfills. More recently other usages of ground rubber tires have been found. In 2003 nearly 290 million scrap tires were generated in the United States, and almost 80% of those waste tires were consumed in applications for fuel, as additives in civil engineering applications, and other uses.

The waste tire rubber is usually cryogenically pulverized into small micron-sized rubber particles. Cut rubber pieces are also ground in ambient conditions to get powder buffing. Those powdered tire rubbers are usually used as fillers in various low-cost rubber or plastic products. Isolation of the carbon black from tire formulations was tried but such products are not necessarily good reinforcing fillers for a new rubber formulation. Utilization of tire rubber materials for value-added applications would be very attractive not only for the recovery of materials but also to control global pollution.

The tire rubber formulation contains significant quantities of carbon black that is used as reinforcing fillers and abrasive resistance for rubber matrices. High structure carbon black made of clusters of ~10-100 nm size fundamental particles are used in tire rubber formulations to enhance mechanical properties of the product. Rubber particles do not exist as a single fundamental particle; rather they are fused together during production of black to make aggregates of various structures. Such structures are retained in vulcanized rubber products such as pneumatic tires that contain dispersed phases of carbon black in rubber matrix.

SUMMARY OF THE INVENTION

A method of recovering carbon black comprises the steps of providing a carbonaceous source material containing carbon black, contacting the carbonaceous source material with a sulfonation bath to produce a sulfonated material, and pyrolyzing the sulfonated material to produce a carbon black containing product comprising a glassy carbon matrix phase having carbon black dispersed therein.

The sulfonation bath can be an oleum bath. The sulfonation bath can comprise a sulfonation agent such as chlorosulfonic acid in 1,2 dichloroethane solution. The sulfonation bath can comprise between 0.1-65 wt. % $SO_3$. The sulfonation bath can comprise 2-30 wt. % $SO_3$. The sulfonation bath can have a temperature of between −20° C. to 200° C.

The pyrolysis step can be conducted at a temperature that is greater than 200° C. The pyrolysis step can be conducted at a temperature that is greater than 400° C. The pyrolysis step can be conducted at a temperature that is greater than 1000° C. The pyrolysis step can be conducted at a temperature that is between 200-1000° C. The duration of the pyrolysis step can be from 1 minute to 48 hours.

The method can further comprising the step of reducing the carbonaceous source material to a powder prior to contacting the carbonaceous source material with the oleum bath. The powder can have an average maximum dimension of less than 100 nm to 10 cm.

The carbonaceous source material can comprise carbon reinforced composites. The carbon reinforcing agent can be at least one selected from the group consisting of carbon black, carbon particles, nanoparticles, mesoparticles and fibers. Mesoparticles are in the range of 100 nm to few microns in size with a pore diameter of 7-20 nm and high surface area. The carbonaceous source material can be a waste material, for example, particularly recyclable material. The waste material can be rubber tires, for example.

The average pore size of the carbon black product can be less than 8 nm. The average pore size of the carbon black product can be between 2 and 120 nm. The isolated carbon can be further surface activated and the density of average pore size of the carbon black product between 1 and 20 nm can be increased.

The carbon black containing product can have a specific surface area of less than 3000 $m^2/g$. The carbon black containing product can have a specific surface area of less than 2000 $m^2/g$, or less than 1000 $m^2/g$. The carbon black containing product can have a specific surface area of less than 100 $m^2/g$. The carbon black containing product can have a specific surface area of less than 10 $m^2/g$.

The pyrolyzing step can occur after the contacting step. The pyrolyzing step can occur before the contacting step.

A method of making a battery electrode comprising carbon black can include the steps of providing a carbonaceous source material containing carbon black, contacting the carbonaceous source material with an oleum bath to produce a sulfonated material, pyrolyzing the sulfonated material to produce a carbon black product comprising a glassy carbon matrix phase having carbon black dispersed therein, and forming a battery electrode from the carbon black containing product. The battery electrode can be an anode. The battery can be a lithium ion or a sodium ion battery. The battery electrode can be two active electrodes. The battery can be a supercapacitor.

BRIEF DESCRIPTION OF THE DRAWINGS

There are shown in the drawings embodiments that are presently preferred it being understood that the invention is not limited to the arrangements and instrumentalities shown, wherein:

FIG. 3 (b) is differential pore volume in both carbons (in magnified scale) at smaller pore widths.

FIGS. 10 (*a*)-(*c*) are TEM images of control tire rubber (Sample #1)-derived carbon. FIG. 10 (*d*) is a Selected Area Electron Diffraction pattern.

FIGS. 11 (*a*)-(*b*) are TEM images of sulfonated rubber tire (Sample #2)-derived carbon. FIG. 11 (*c*) is a Selected Area Electron Diffraction pattern.

DETAILED DESCRIPTION OF THE INVENTION

Figure 1:
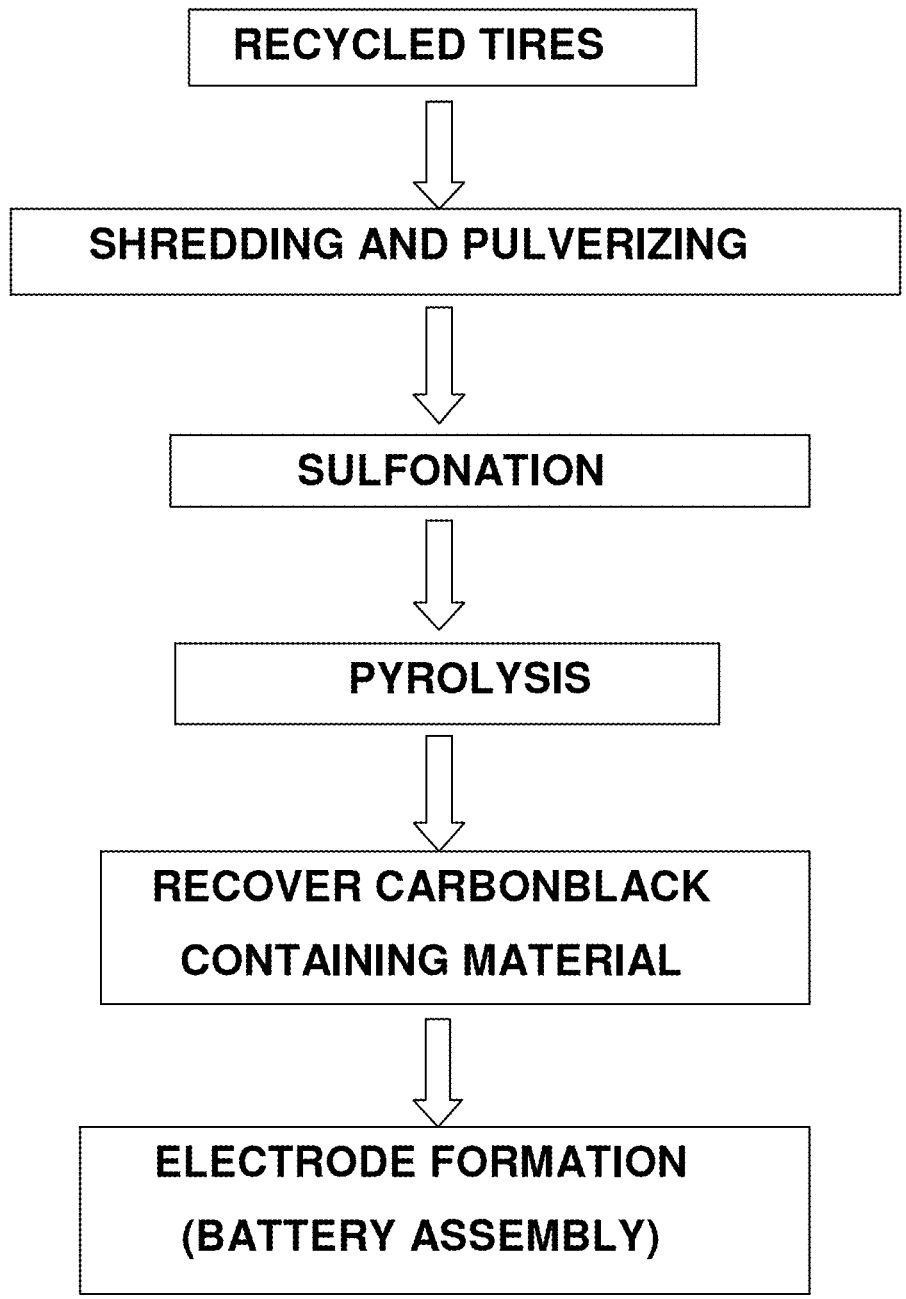
FIG. 1 is a schematic diagram of a method for recovering carbon black in modified form from recycled tire rubber.

A method of recovering carbon black as shown in FIG. 1 includes the step of providing a carbonaceous source material containing carbon black. The carbonaceous source material is soaked in a sulfonation bath to produce a sulfonated material. The sulfonated material is pyrolyzed to produce a carbon black containing product comprising a glassy carbon matrix phase having carbon black dispersed therein.

The sulfonation bath can comprise any reactant composition capable of sulfonating rubber. It is also capable of sulfonating vulcanized particulate rubbers containing carbon black or carbon particles or carbon fiber or carbon nanomaterials. In one aspect the sulfonation bath can be an oleum bath. The oleum bath can comprise up to 65 wt. % $SO_3$ in concentrated sulfuric acid. Very high $SO_3$ content in oleum bath causes solidification of reactant mix and therefore, may not be useful for processing. The sulfonation bath can be a sulfuric acid ($H_2SO_4$) solution. The concentration of sulfuric acid in the oleum bath can be between 10 and 100 wt. %. The sulfonation bath can comprise other sulfonation agents such as chlorosulfonic acid in 1,2 dichloroethane solution, organic solvents (such as 1,2 dichloroethane) containing $SO_3$ gas, or equimolar mixture of acetic anhydride concentrated sulfuric acid that yields acetyl sulfate. Acetyl sulfate assists in electrophilic sulfonation of aromatic ring in styrene containing rubbers but $SO_3$ can aid free radical sulfonation of aliphatic segments. Thus, the sulfonation bath can comprise a liquid, a gas, or a liquid and a gas. The sulfonation bath can comprise between 0.1-65 wt. % $SO_3$ in liquid medium that can be concentrated sulfuric acid or organic solvents. The sulfonation bath can comprise any minimum percentage and maximum percentage within this range, such as 5-20, 2-18, 2-30, or 0.1-2 wt. % $SO_3$.

The sulfonation bath can have a temperature of between −20 to 200° C.

The pyrolysis step can be conducted at a temperature that is greater than 400° C. The pyrolysis step can be conducted at a temperature that is greater than 1000° C. The pyrolysis step can be conducted at a temperature that is between 200-1000° C. The duration of the pyrolysis step can be from 1 minute to 12 hours or more. The conditions of the pyrolysis step such as temperature and duration can be selected depending on process conditions including the particular carbonaceous source material that is being pyrolyzed.

The pyrolysis step of high carbon content hydrocarbon polymer composites can also be maintained at the desulfonation temperature range when sulfur containing volatiles comes out of the material leaving unsaturated hydrocarbon with high carbon content.

The carbon content in pyrolyzed carbon materials can be higher than 80 wt. %.

The method can include the steps of reducing the carbonaceous source material to a powder prior to contacting the carbonaceous source material with the oleum bath. The powder can be formed by any suitable method such as grinding, milling, cutting, and cryogenic pulverization. The powder so formed can have an average maximum dimension of less than 100 nm to 10 cm. Metal particles such as Ni, stainless steel, Iron, and oxides such as ZnO, $SiO_2$ and others present along with carbonaceous source material may also dissolve in the oleum bath and yield carbon powder with no metals and/or oxides or up to ppm levels of metals. The presence of Ca comes from caolin or talc filler in rubber compounds and can form insoluble sulfates by reaction with sulfonating agents such as, for example, sulfuric acid. To avoid such impurities, if required, the tire rubbers can be washed with aqueous hydrochloric acid, nitric acid, or an acidic salt (for example ammonium chloride) solution prior to sulfonation.

The carbonaceous source material can be any suitable carbon black containing source material. One such source material comprises carbon black loaded plastics, scrap electronic casing containing carbon black loaded plastics that serve as electromagnetic shielding material, polymeric carbon nanocomposites containing carbon particles, and carbon fiber reinforced composites. The carbonaceous source material can be a waste material, such as scrap vulcanized rubber tires or recycled vulcanized rubbers from other sources.

The product of the invention is a carbon black containing product comprising a glassy carbon matrix phase having carbon black dispersed therein. The carbon black containing carbonaceous product is porous with a multi-modal pore size distribution with some pore width r, where 8 nm<r>120 nm and some pore width less than 8 nm but greater than 2 nm. The average pore size of the carbon black containing product can be between 2 and 120 nm. The carbon black containing product can have a Brunauer-Emmett-Teller (BET) specific surface area of less than 1000 $m^2/g$ depending on the continuity of carbon matrix. The specific surface area in composite can be less than 100 $m^2/g$.

The BET specific surface area in the carbon particle containing carbon matrix products can further be modified by deploying a surface activation process. Surface activation process is well known in art that produces activated carbon. Activated carbon can be synthesized from pyrolyzed carbon residues by activating it in steam or $CO_2$ at elevated temperature ranging from 200 to 1000° C. that results partially burnt out carbon residue with higher porosity. The added porosity by surface activation is usually microporosity with pore widths less than 50 nm. Activation of carbon can also be achieved by treating it with alkali followed by heat treatment in the presence of water vapors.

A battery electrode can be formed from the carbon black containing product. This electrode can be an anode for lithium-ion or sodium-ion batteries.

A method of making a battery electrode comprising carbon black can include the steps of providing a carbonaceous source material containing carbon black, contacting the carbonaceous source material with a sulfonation bath to produce a sulfonated material, pyrolyzing the sulfonated material to produce a carbon black containing product comprising a glassy carbon matrix phase having carbon black dispersed therein; and forming a battery electrode from the carbon black containing product. The electrode can be an anode. The battery can be formed by suitable techniques. The battery can be a lithium (Li) ion battery, and/or a sodium (Na) ion battery.

Carbon black was recovered from powdered tire rubber by two methods: (1) simple pyrolysis of powder rubber at 1000° C. (nitrogen atmosphere) that yields 30-40% carbon (control rubber tire derived carbon, Sample #1) and (2) digestion of rubber powders in a hot oleum bath (18-24% $SO_3$) to yield sulfonated rubber powder that was then filtered, washed and compressed to make a solid cake followed by pyrolysis in an inert atmosphere (sulfonated rubber tire derived carbon, Sample #2). Sample 2 produced a carbon monolith with a little higher yield (2-5% increase in carbon yield compared to the control rubber powder; Sample 1) whereas Sample 1 produced fluffy (low bulk density) powder of carbon black. The isolated carbon material (from either sample) was used to test their electrochemical performance as an active anode material in Li-ion battery.

Carbon black was also isolated from ground tire rubber by conventional pyrolysis (400-1000° C. in inert atmosphere) followed by treatment of the char with oleum bath and subsequent heat treatment of washed/dried charred residue in inert environment. The oleum bath can have a concentration of 0.1-30 wt. % $SO_3$. Since the material was charred before treatment in sulfonation bath it does not require very high temperature treatment in second carbonization step. The second heat treatment can be above 200° C.; however, higher temperature gives higher rigidity or graphitic order in the derived carbon.

Example 1

Tire rubber powder of 80-120 μm size range consisting of polymer mixture of natural rubber, butadiene rubber, and styrene-butadiene rubber (45%), carbon black (33%), inorganic filler and vulcanization activator (10%) and residual extractable and volatile materials with specific gravity of 1.15 g/cc was used for the pyrolytic recovery of carbon black. The powder rubber sample was heated in a tubular furnace under nitrogen atmosphere at 1000° C. The temperature of the furnace was raised from room temperature to 1000° C. by heating it at 10° C./min and when it reached at 1000° C. it was held at that temperature for 15 minutes. The furnace was cooled to room temperature and the carbon residue was collected. The sample is termed as control carbon (Sample #1). The carbon black yield was 33%.

Example 2

Tire rubber powder of 80-120 μm size range consisting of polymer mixture of natural rubber, butadiene rubber, and styrene-butadiene rubber (45%), carbon black (33%), inorganic filler and vulcanization activator (10%) and residual extractable and volatile materials with specific gravity of 1.15 g/cc was used for a chemical pretreatment prior to pyrolysis. The tire rubber powder was treated with fuming sulfuric acid containing 20 wt. % free $SO_3$ gas at 70° C. for 12 h. The tire rubber slurry was filtered on a Buchner funnel with sintered glass disc (fritted glass funnel) using an aspirator followed by washing with distilled water. The washed sulfonated tire rubber cake was then dried at 80° C. for 1 h followed by pyrolysis in tubular furnace under nitrogen atmosphere at 1000° C. The furnace temperature was reached to 1000° C. by heating the furnace from room temperature at 10° C./min and allowing a soak time of 15 minute at 1000° C. The furnace was allowed to cool to room temperature and the environment was maintained under nitrogen before the sample was taken out.

Example 3

Tire rubber powder of 80-120 μm size range consisting of polymer mixture of natural rubber, butadiene rubber, and styrene-butadiene rubber (45%), carbon black (33%), inorganic filler and vulcanization activator (10%) and residual extractable and volatile materials with specific gravity of 1.15 g/cc was used for a chemical pretreatment prior to pyrolysis. The tire rubber powder was treated with fuming sulfuric acid containing 20 wt. % free $SO_3$ gas at 70° C. for 12 h. The tire rubber slurry was filtered on a Buchner funnel with sintered glass disc (fritted glass funnel) using an aspirator followed by washing with distilled water. The washed sulfonated tire rubber cake was then pressed between Teflon sheets under a hot plate inside a compression mold at 110° C. to get rid of moisture and to obtain a thick (2 mm) molded sheet followed by pyrolysis in tubular furnace under nitrogen atmosphere at 1000° C. The furnace temperature reached 1000° C. by heating the furnace from room temperature at 10° C./min and allowing a soak time of 15 minute at 1000° C. The furnace was allowed to cool to room temperature and the environment was maintained under nitrogen before the monolith carbon sample was taken out. The sample is termed as sulfonated tire-rubber-derived carbon (Sample #2). The yield of carbon based on as received material (non-sulfonated rubber) was 38%.

Example 4

The tire rubber powder of 0.5 mm size consisting of polymer mixture of natural rubber, butadiene rubber, and styrene-butadiene rubber (42%), carbon black (33%), inorganic filler and vulcanization activator (11%) and residual extractable and volatile materials with specific gravity of 1.14 g/cc was used for a chemical pretreatment prior to pyrolysis. The tire rubber powder was treated with fuming sulfuric acid containing 30 wt. % free $SO_3$ gas at 40° C. for 48 h. The tire rubber slurry was filtered on a fritted glass funnel using an aspirator followed by washing with distilled water. The washed sulfonated tire rubber cake was then dried at 80° C. for 1 h followed by pyrolysis in tubular furnace under nitrogen atmosphere at 600° C. The furnace temperature reached 600° C. by heating the furnace from room temperature at 10° C./min and allowing a soak time of 60 minutes at 600° C. The furnace was allowed to cool to room temperature and the environment was maintained under nitrogen before the sample was taken out. The yield of carbon based on as received material (non-sulfonated rubber) was 40%.

Example 5

Tire rubber powder of 80-120 μm size range consisting of polymer mixture of natural rubber, butadiene rubber, and styrene-butadiene rubber (45%), carbon black (33%), inorganic filler and vulcanization activator (10%) and residual extractable and volatile materials with specific gravity of 1.15 g/cc was used for a chemical pretreatment prior to pyrolysis. The tire rubber powder was treated with concentrated sulfuric acid (98% $H_2SO_4$) at 100° C. for 24 h. The tire rubber slurry was filtered on a fritted glass funnel using an aspirator followed by washing with distilled water. Washed sulfonated tire rubber cake was then dried at 80° C. for 1 h followed by pyrolysis in tubular furnace under nitrogen atmosphere at 600° C. The furnace temperature reached 600° C. by heating the furnace from room temperature at 10° C./min and allowing a soak time of 60 minute at 600° C. The furnace was allowed to cool to room temperature and the environment was maintained under nitrogen before the sample was taken out. The yield of carbon based on as received material (non-sulfonated rubber) was 37%.

Example 6

Carbon black was isolated from ground tire rubber by conventional pyrolysis at 600° C. in inert atmosphere. The isolated porous carbon or the char was treated in oleum bath at 70° C. for 12 h; the oleum had 20 wt. % $SO_3$ in concentrated sulfuric acid. The slurry of carbonaceous mass was washed, dried, and subsequent heat treated in inert environment ($N_2$) at 1000° C. The heating of furnace was conducted at 12° C./min from room temperature to 1000° C. and maintained 1000° C. for 15 minutes before it was cooled to room temperature.

In all the examples, pyrolysis can also be done in Argon or other inert atmosphere such as Helium instead of nitrogen atmosphere.

The schematic of the recovery of pyrolytic carbon black materials (both in unmodified and modified forms), from the recycled tires, is shown in FIG. 1. The schematic shows that these are used as low-cost anodes in lithium-ion batteries.

Figure 2:
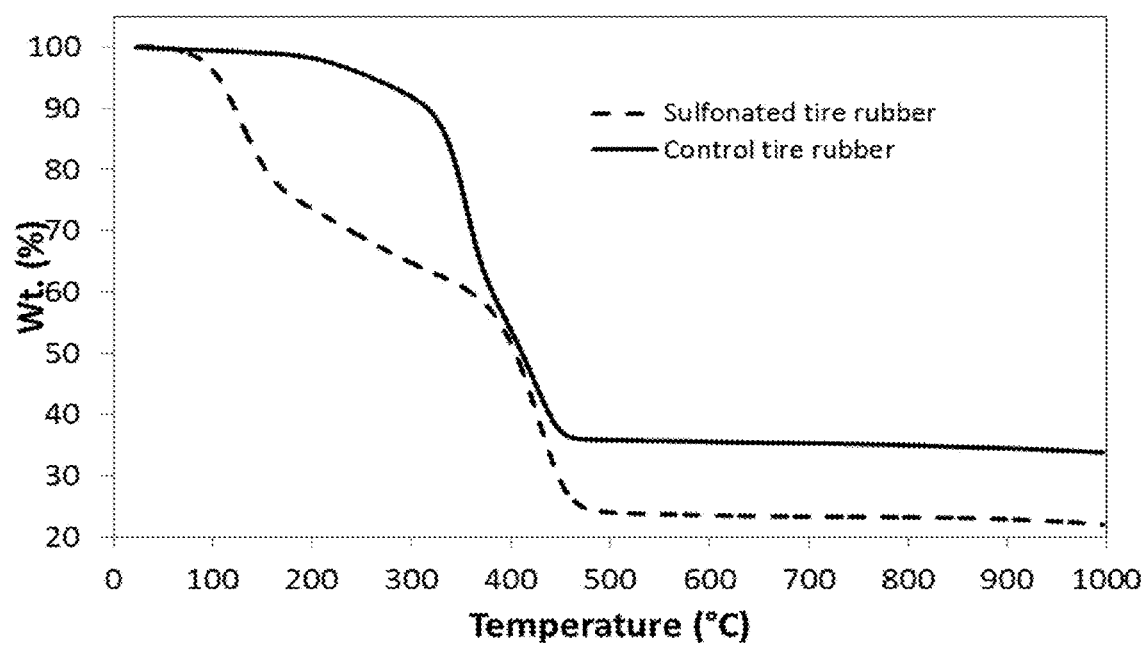
FIG. 2 is thermogravimetric analysis (TGA) thermograms of precursors for Sample #1 (control tire rubber) and Sample #2 (sulfonated tire rubber).

The TGA data of the Samples 1-2 are shown in FIG. 2. The first weight loss in sample 2 around 150° C. is the desulfonation step that shifts the pyrolysis temperature of rubber to slightly higher temperature. The relative char yield in desulfonated material, compared to control tire rubber (Sample #1), is slightly higher.

Figure 3:
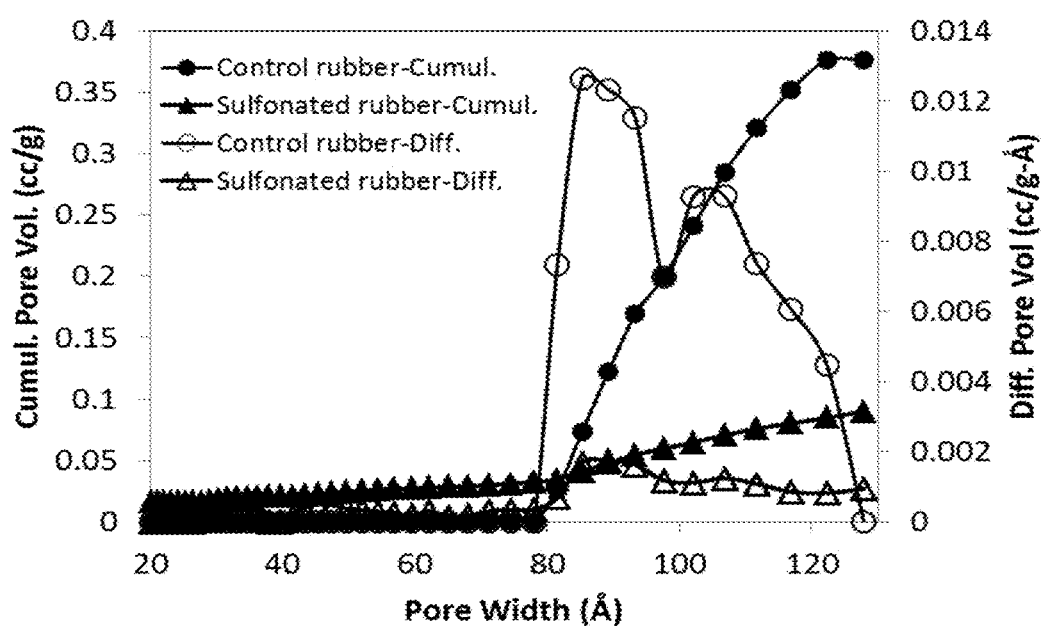
FIG. 3 (a) is cumulative pore volume data based on BET adsorption-desorption data analysis of carbons from Sample #1 (control tire rubber derived carbon) and Sample #2 (carbon from sulfonated tire rubber powder).
Figure 3:
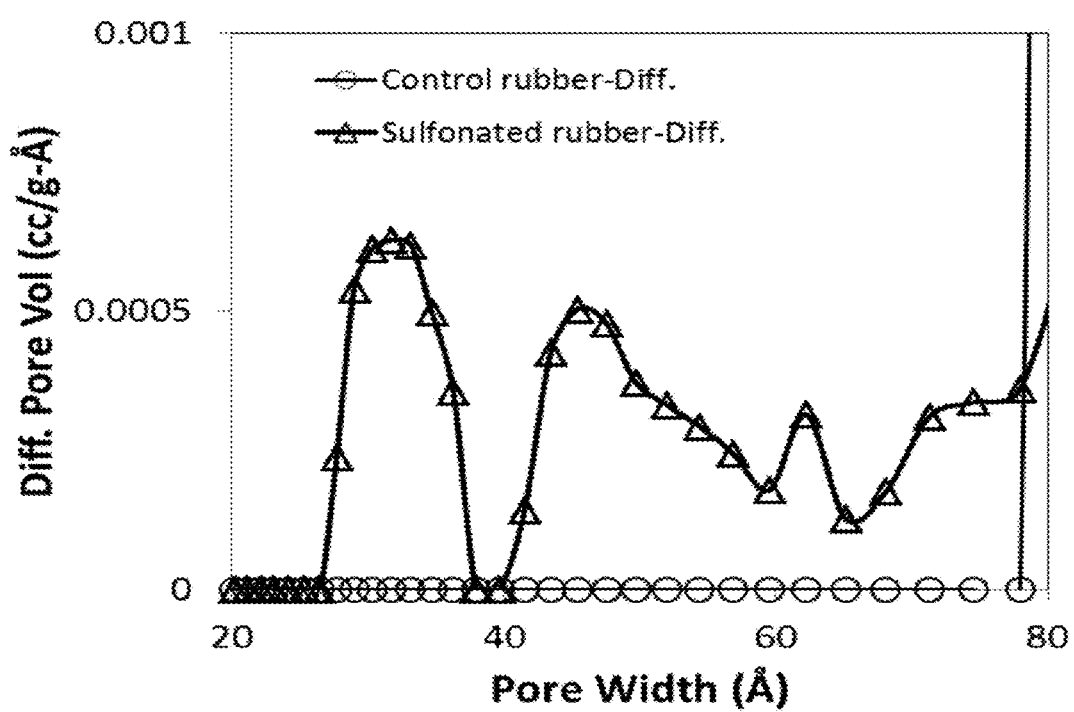

The Brunauer-Emmett-Teller (BET) surface area analysis of the recovered carbon from Samples 1 and 2 are displayed in FIG. 3. In control Sample #1 the pore sizes are in the range of 8-13 nm (80-130 Å) and it does not show any pore width smaller than 8 nm. However the sulfonation treatment prior to pyrolysis allows formation very small volume fraction of pores with width of 3-4 nm. Without wishing to be limited, it is believed that these pores are detected due to the thin carbon films created on the carbon black particles by the pyrolyzing char-forming rubber (sulfonated rubber). When the rubber is not sulfonated it does not yield detectable char. Further, sulfonation creates hard carbon with low pore volume. Data analysis shows that sulfonated tire rubber yields carbon with 64 $m^2/g$ specific surface area; whereas that of the control carbon (fluffy carbon from Sample #1) is 96 $m^2/g$.

Electrochemical studies were done by preparing CR2032 coin cells. The coin half cells were assembled in an argon-filled glove box using recycled carbon (Samples #1 and #2), as the working electrode and metallic lithium foil as the counter electrode. The anode was prepared by casting slurry of 80% active recycled carbon material, 5 wt. % super conducting carbon. and 15 wt. % polyvinylidene difluoride (PVDF) binder in n-methyl-2-pyrrolidone (NMP) solvent on copper foil. The main characteristics of conducting carbon are high purity, long structure and moderate surface area. It is also possible use up to 95% active recycled carbon material and down to 5 wt. % polyvinylidene difluoride (PVDF) binder in n-methyl-2-pyrrolidone (NMP) solvent on copper foil. The electrolyte for Li-ion batteries consisted of a solution of 1 M $LiPF_6$ in ethylene carbonate (EC)/dimethyl carbonate (DMC)/diethyl carbonate (DEC) (1:1:1 by volume). Galvanostatic charge/discharge cycling between the voltages of 0-3.0 V was performed at room temperature under different rates using an Arbin potentiostat/galvanostat multichannel system. The use of active super carbon in the electrode slurry composition can be minimized and finally eliminated if the isolated carbons (Sample #1 or 2) are activated by conventional method for activated carbon synthesis, followed by high temperature treatment at temperature T, where 3000° C.<T>1000° C., that increases electrical conductivity significantly. Steam or $CO_2$ activation increases porosity and active surface area in the produced or recovered carbon materials.

Figure 4:
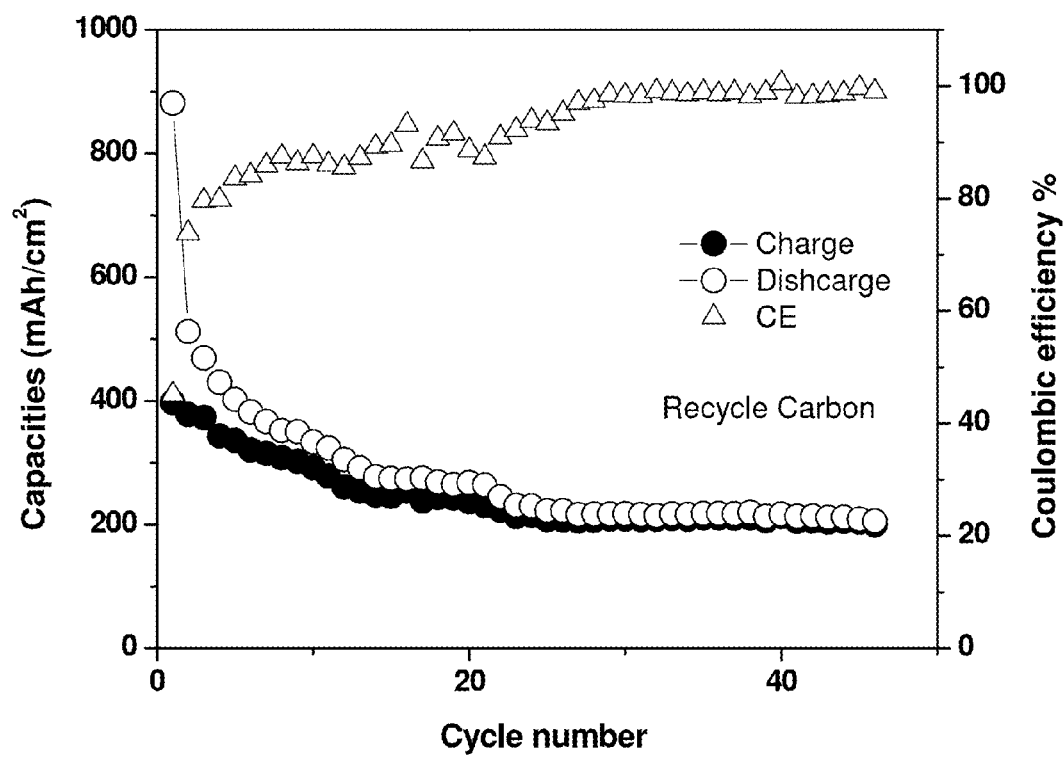
FIG. 4 is cycling performance of the control tire rubber-derived carbon (Sample #1) anode at 0.1 C.
Figure 5:
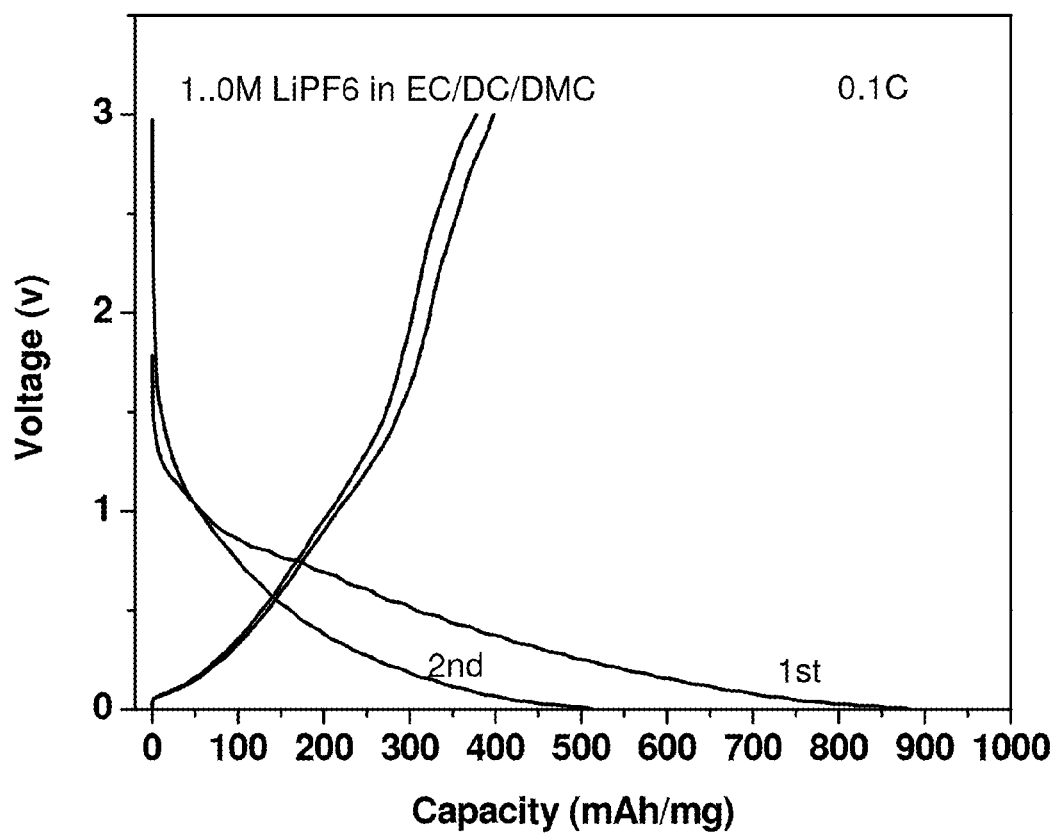
FIG. 5 is the 1st and 2nd charge-discharge curves of the control tire rubber (Sample #1)-derived carbon anode at 0.1 C.
Figure 6:
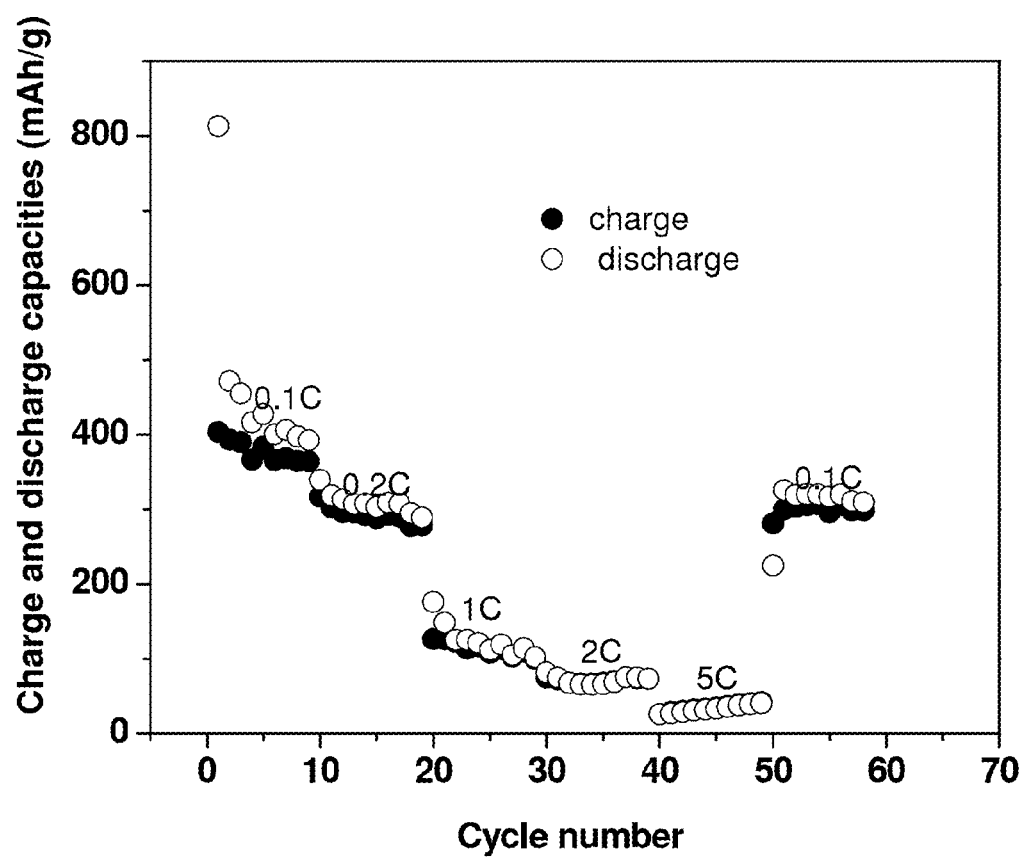
FIG. 6 is rate performance of the control tire rubber (Sample #1)-derived carbon anode.

FIG. 4 shows the cycling performance of the control tire rubber (Sample #1)-derived carbon at 0.1 C or C/10 (where 1 C corresponds to one charge-discharge cycle in an hour). FIG. 5 shows the galvanostatic discharge/charge curves of the same anodes (control tire rubber-derived carbon) between 0 and 3 V at a rate of 0.1 C. According to FIGS. 4 and 5, Sample #1-derived carbon exhibited an initial capacity of ~900 mAh/g at the first discharge, but the reversible capacity of only ~500 mAh/g was attained, which led to much lower initial coulombic efficiency of 45%. Then the capacity decreased to ~200 mAh/g and the coulombic efficiency increased slowly to 99% after 45 cycles. FIG. 6 shows the rate performance of the control tire rubber (Sample #1)-derived carbon anodes. It clearly shows a rate performance with ~100 mAh/g at 1 C, only ~40 mAh/g at 5 C, which are much lower than the sulfonated tire rubber (Sample #2)-derived carbon.

Figure 7:
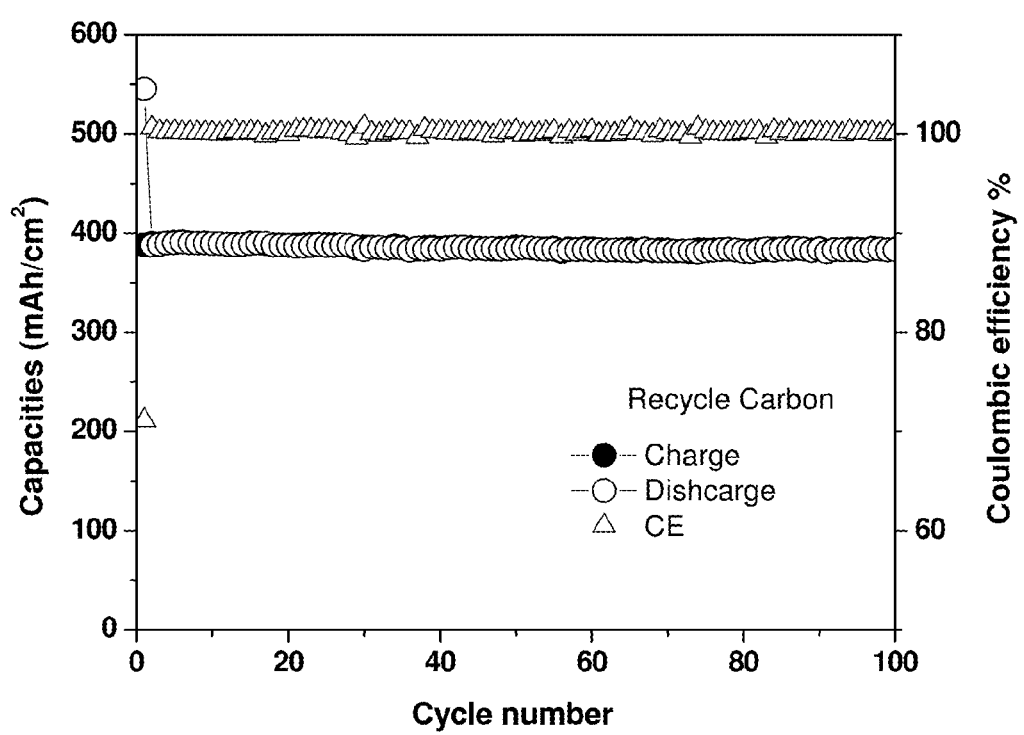
FIG. 7 is cycling performance of the sulfonated tire rubber (Sample #2)-derived carbon anode at 0.1 C.
Figure 8:
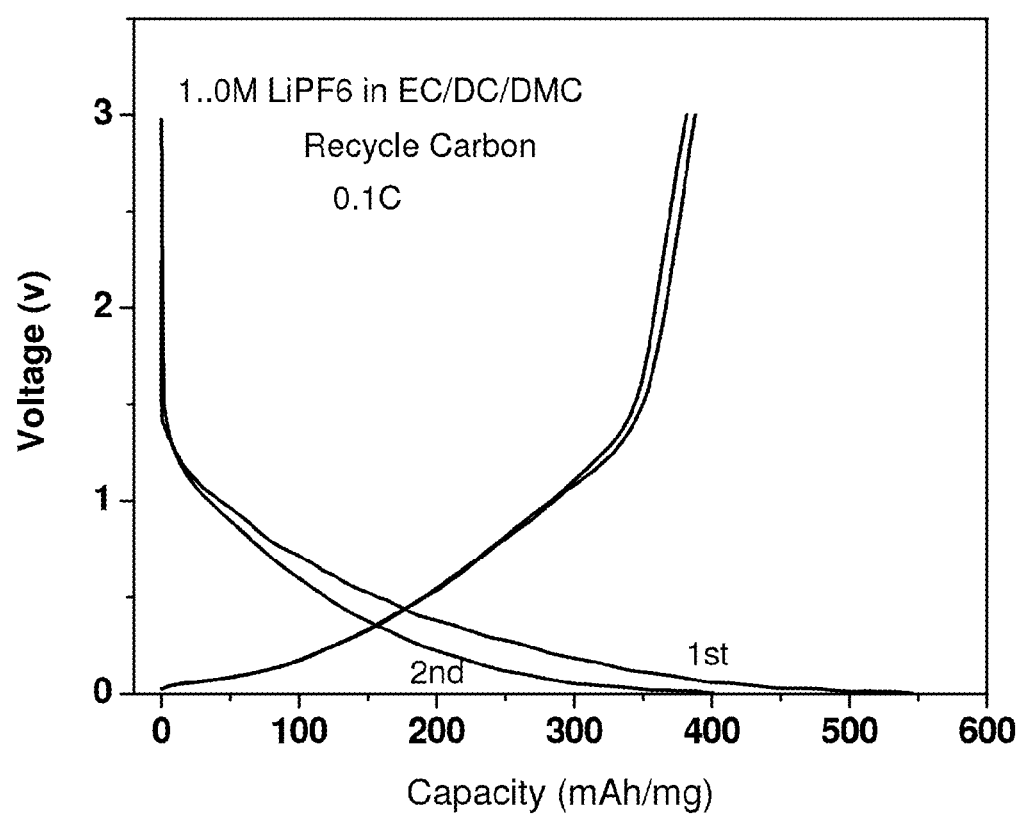
FIG. 8 is 1st and 2nd charge-discharge curves of the sulfonated tire rubber (Sample #2)-derived carbon anode at 0.1 C.
Figure 9:
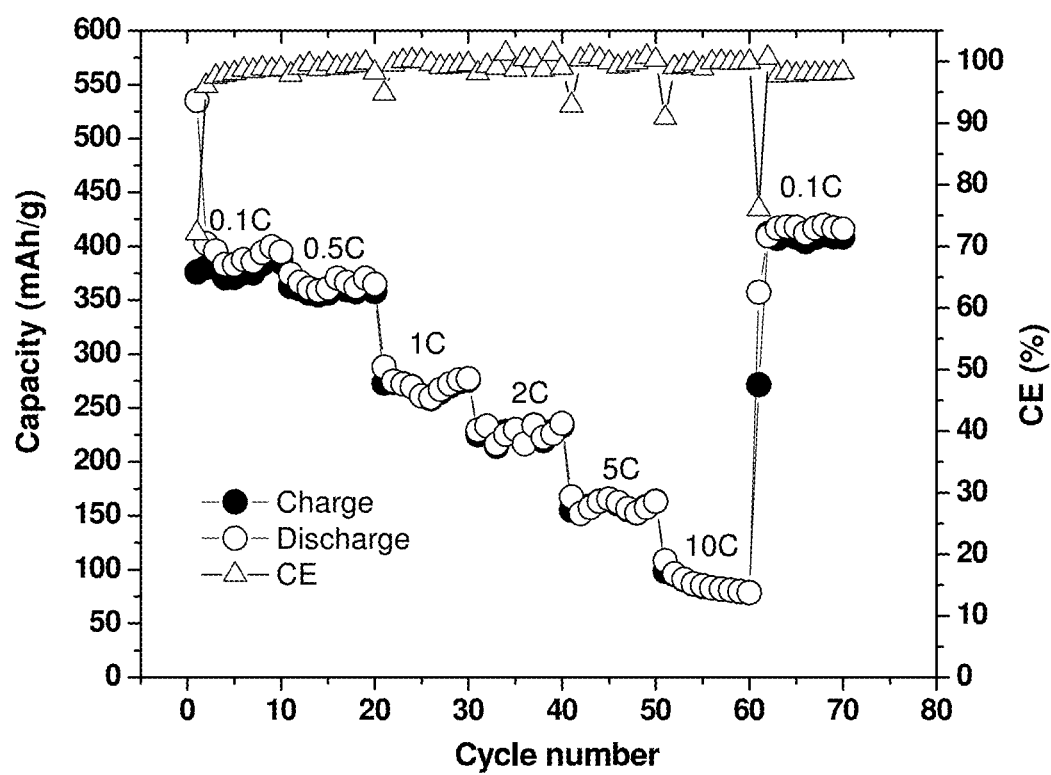
FIG. 9 is the rate performance of the half-cell made from sulfonated tire rubber (Sample #2)-derived carbon.

FIG. 7 shows the cycling performance of the half-cell made from sulfonated tire rubber-derived carbon (Sample #2) materials. A half-cell made by use of Sample #2 exhibited a reversible capacity of ~400 mAh/g after 100 cycles with coulombic efficiency of almost 100%. This result is comparable to the theoretical capacity of 362 mAh/g for commercial carbon anodes. FIG. 8 shows the galvanostatic discharge/charge curves of the anodes made from sulfonated tire rubber-derived carbon between 0 and 3 V at a rate of 0.1 C. During the first discharge, the voltage pseudoplateau near 0 V contributes to a large irreversible capacity. The first discharge capacity is around 500 mAh/g, and a reversible charge capacity around 400 mAh/g, leading to an irreversible capacity of 100 mAh/g. However, both second discharge capacity and reversible charge capacity is around 400 mAh/g. The reversible capacity was maintained to 100 cycles. FIG. 9 shows the rate performance of the sulfonated tire rubber-derived carbon (Sample #2) anodes. It clearly shows a good rate performance with ~270 mAh/g at 1 C, 160 mAh/g at 5 C, and over 50 mAh/g at 10 C. Results obtained from Sample #1 were compared with Sample #2. Based on these results, electrochemical performances of carbon from Sample #2 are much better than those from Sample #1.

TEM images of carbon from Samples #1 and #2 are reported in FIGS. 10 and 11. Sample #1 (FIG. 10) has the morphology of spherical nanoparticles with an irregular cluster shape. Selected Area Electron Diffraction pattern indicates the presence of completely amorphous carbon materials. Sample #2-derived carbon (FIG. 11) has the morphology of 1D (one dimensional) nanostructure. It formed a monolith hard carbon and when that was ground it formed fibriler or oriented structure. Selected Area Electron Diffraction pattern indicates the presence of both crystalline and amorphous carbon materials.

These results demonstrate that recycled carbon materials with proper treatment have been used successfully to develop a novel, low-cost, rechargeable anodes for lithium ion batteries. Recovered hard carbons when treated properly ($CO_2$ or steam activation) after or during carbonization can yield very high surface area. It is expected that sample #1 being amorphous in nature can be activated easily with higher burn out rate than that of sample #2 under identical conditions. An exemplary activation condition was exposure of the carbon samples at 700° C. under constant flow of $CO_2$ for 2 hours. Those activated carbons would be useful for supercapacitors, in addition to Li-ion batteries, Na-ion batteries, and other energy storage devices as well. The activation can also be done by treating sulfonated precursor to a high temperature where desulfonating gases cause surface activation. Sulfuric acid treated graphites particles are conventionally used to make exfoliated grapheme oxide material [Hummers W S; Offeman R E. J. Am. Chem. Soc. 1985, 80(6), 1339].

This invention can be embodied in other forms without departing from the spirit or essential attributes thereof. Reference should be made to the following claims to determine the scope of the invention.

We claim:

1. A method of recovering carbon black, comprising the steps of:
   providing a carbonaceous source material containing carbon black;
   contacting the carbonaceous source material with a sulfonation bath to produce a sulfonated material, wherein the sulfonation bath comprises sulfonation agent is chlorosulfonic acid in 1,2 dichloroethane solution; and,
   pyrolyzing the sulfonated material to produce a carbon black containing product comprising a glassy carbon matrix phase having carbon black dispersed therein.

2. The method of claim 1, wherein the sulfonation bath is an oleum bath.

3. The method of claim 1, wherein the sulfonation bath comprises between 0.1-65 wt. % $SO_3$.

4. The method of claim 1, wherein pyrolysis step is conducted at a temperature that is greater than 1000° C.

5. The method of claim 1, wherein pyrolysis step is conducted at a temperature that is between 200-1000° C.

6. The method of claim 1, further comprising the steps of reducing the carbonaceous source material to a powder prior to contacting the carbonaceous source material with the oleum bath.

7. The method of claim 6, wherein the powder has an average maximum dimension of less than 100 nm to 10 cm.

8. The method of claim 1, wherein the carbonaceous source material comprises carbon reinforced composites.

9. The method of claim 8, wherein the carbon reinforcing agent is at least one selected from the group consisting of carbon black, carbon particles, nanoparticles, mesoparticles and fibers.

10. The method of claim 1, wherein the carbonaceous source material is a waste material.

11. The method of claim 10, wherein the waste material is rubber tires.

12. The method of claim 1, wherein the carbon black containing product has a specific surface area of less than 1000 $m^2/g$.

13. The method of claim 1, wherein the pyrolyzing step occurs after the contacting step.

14. The method of claim 1, wherein the pyrolyzing step occurs before the contacting step.

15. A method of recovering carbon black, comprising the steps of:
   providing a carbonaceous source material containing carbon black;
   contacting the carbonaceous source material with a sulfonation bath to produce a sulfonated material,
   pyrolyzing the sulfonated material to produce a carbon black containing product comprising a glassy carbon matrix phase having carbon black dispersed therein; and
   wherein the carbon black product has an average pore size of less than 8 nm.

16. The method of claim 15, wherein the sulfonation bath is an oleum bath.

17. The method of claim 15, wherein the sulfonation bath comprises between 0.1-65 wt. % $SO_3$.

18. The method of claim 15, wherein pyrolysis step is conducted at a temperature that is greater than 1000° C.

19. The method of claim 15, wherein pyrolysis step is conducted at a temperature that is between 200-1000° C.

20. The method of claim 15, further comprising the steps of reducing the carbonaceous source material to a powder prior to contacting the carbonaceous source material with the oleum bath.

21. The method of claim 20, wherein the powder has an average maximum dimension of less than 100 nm to 10 cm.

22. The method of claim 15, wherein the carbonaceous source material comprises carbon reinforced composites.

23. The method of claim 22, wherein the carbon reinforcing agent is at least one selected from the group consisting of carbon black, carbon particles, nanoparticles, mesoparticles and fibers.

24. The method of claim 15, wherein the carbonaceous source material is a waste material.

25. The method of claim 24, wherein the waste material is rubber tires.

26. The method of claim 15, wherein the carbon black containing product has a specific surface area of less than 1000 $m^2/g$.

27. The method of claim 15, wherein the pyrolyzing step occurs after the contacting step.

28. The method of claim 15, wherein the pyrolyzing step occurs before the contacting step.

29. A method of recovering carbon black, comprising the steps of:
   providing a carbonaceous source material containing carbon black;
   contacting the carbonaceous source material with a sulfonation bath to produce a sulfonated material,
   pyrolyzing the sulfonated material to produce a carbon black containing product comprising a glassy carbon matrix phase having carbon black dispersed therein; and
   wherein the carbon black product has an average pore size of between 2 and 120 nm.

30. The method of claim 29, wherein the sulfonation bath is an oleum bath.

31. The method of claim 29, wherein the sulfonation bath comprises between 0.1-65 wt. % $SO_3$.

32. The method of claim 29, wherein pyrolysis step is conducted at a temperature that is greater than 1000° C.

33. The method of claim 29, wherein pyrolysis step is conducted at a temperature that is between 200-1000° C.

34. The method of claim 29, further comprising the steps of reducing the carbonaceous source material to a powder prior to contacting the carbonaceous source material with the oleum bath.

35. The method of claim 34, wherein the powder has an average maximum dimension of less than 100 nm to 10 cm.

36. The method of claim 29, wherein the carbonaceous source material comprises carbon reinforced composites.

37. The method of claim 36, wherein the carbon reinforcing agent is at least one selected from the group consisting of carbon black, carbon particles, nanoparticles, mesoparticles and fibers.

38. The method of claim 29, wherein the carbonaceous source material is a waste material.

39. The method of claim 38, wherein the waste material is rubber tires.

40. The method of claim 29, wherein the carbon black containing product has a specific surface area of less than 1000 m$^2$/g.

41. The method of claim 29, wherein the pyrolyzing step occurs after the contacting step.

42. The method of claim 29, wherein the pyrolyzing step occurs before the contacting step.

43. A method of recovering carbon black, comprising the steps of:
providing a carbonaceous source material containing carbon black;
contacting the carbonaceous source material with a sulfonation bath to produce a sulfonated material,
pyrolyzing the sulfonated material to produce a carbon black containing product comprising a glassy carbon matrix phase having carbon black dispersed therein; and
wherein the carbon black product is further surface activated and the carbon black product has an average pore size between 1 and 20 nm and a density of pores having an average pore size between 1 and 20 nm is increased.

44. The method of claim 43, wherein the sulfonation bath is an oleum bath.

45. The method of claim 43, wherein the sulfonation bath comprises between 0.1-65 wt. % SO$_3$.

46. The method of claim 43, wherein pyrolysis step is conducted at a temperature that is greater than 1000° C.

47. The method of claim 43, wherein pyrolysis step is conducted at a temperature that is between 200-1000° C.

48. The method of claim 43, further comprising the steps of reducing the carbonaceous source material to a powder prior to contacting the carbonaceous source material with the oleum bath.

49. The method of claim 48, wherein the powder has an average maximum dimension of less than 100 nm to 10 cm.

50. The method of claim 43, wherein the carbonaceous source material comprises carbon reinforced composites.

51. The method of claim 50, wherein the carbon reinforcing agent is at least one selected from the group consisting of carbon black, carbon particles, nanoparticles, mesoparticles and fibers.

52. The method of claim 43, wherein the carbonaceous source material is a waste material.

53. The method of claim 52, wherein the waste material is rubber tires.

54. The method of claim 43, wherein the carbon black containing product has a specific surface area of less than 1000 m$^2$/g.

55. The method of claim 43, wherein the pyrolyzing step occurs after the contacting step.

56. The method of claim 43, wherein the pyrolyzing step occurs before the contacting step.

57. A method of recovering carbon black, comprising the steps of:
providing a carbonaceous source material containing carbon black;
contacting the carbonaceous source material with a sulfonation bath to produce a sulfonated material,
pyrolyzing the sulfonated material to produce a carbon black containing product comprising a glassy carbon matrix phase having carbon black dispersed therein; and
wherein the carbon black containing product has a specific surface area of less than 100 m$^2$/g.

58. The method of claim 57, wherein the sulfonation bath is an oleum bath.

59. The method of claim 57, wherein the sulfonation bath comprises between 0.1-65 wt. % SO$_3$.

60. The method of claim 57, wherein pyrolysis step is conducted at a temperature that is greater than 1000° C.

61. The method of claim 57, wherein pyrolysis step is conducted at a temperature that is between 200-1000° C.

62. The method of claim 57, further comprising the steps of reducing the carbonaceous source material to a powder prior to contacting the carbonaceous source material with the oleum bath.

63. The method of claim 62, wherein the powder has an average maximum dimension of less than 100 nm to 10 cm.

64. The method of claim 57, wherein the carbonaceous source material comprises carbon reinforced composites.

65. The method of claim 64, wherein the carbon reinforcing agent is at least one selected from the group consisting of carbon black, carbon particles, nanoparticles, mesoparticles and fibers.

66. The method of claim 57, wherein the carbonaceous source material is a waste material.

67. The method of claim 66, wherein the waste material is rubber tires.

68. The method of claim 57, wherein the pyrolyzing step occurs after the contacting step.

69. The method of claim 57, wherein the pyrolyzing step occurs before the contacting step.

70. A method of making a battery electrode comprising carbon black, the method comprising the steps of:
providing a carbonaceous source material containing carbon black;
contacting the carbonaceous source material with an oleum sulfonation bath to produce a sulfonated material;
wherein the sulfonation bath comprises sulfonation agent is chlorosulfonic acid in 1,2 dichloroethane solution; and,
pyrolyzing the sulfonated material to produce a carbon black product comprising a glassy carbon matrix phase having carbon black dispersed therein; and,
forming a battery electrode from the carbon black containing product.

71. The method of claim 70, wherein the battery electrode is an anode.

72. The method of claim 71, wherein the battery is a lithium ion or a sodium ion battery.

73. The method of claim 70, wherein the battery is a lithium ion battery or a sodium ion battery.

74. A method of making a battery electrode comprising carbon black, the method comprising the steps of:
providing a carbonaceous source material containing carbon black;
contacting the carbonaceous source material with an oleum bath to produce a sulfonated material;
pyrolyzing the sulfonated material to produce a carbon black product comprising a glassy carbon matrix phase having carbon black dispersed therein;
wherein the carbon black product has an average pore size that is less than 8 nm; and, forming a battery electrode from the carbon black containing product.

75. The method of claim 74, wherein the battery electrode is an anode.

76. The method of claim 75, wherein the battery is a lithium ion or a sodium ion battery.

77. The method of claim 74, wherein the battery is a lithium ion battery or a sodium ion battery.

78. A method of making a battery electrode comprising carbon black, the method comprising the steps of:
providing a carbonaceous source material containing carbon black;
contacting the carbonaceous source material with an oleum bath to produce a sulfonated material;
pyrolyzing the sulfonated material to produce a carbon black product comprising a glassy carbon matrix phase having carbon black dispersed therein;
wherein the carbon black product has an average pore size that is between 2 and 120 nm; and
forming a battery electrode from the carbon black containing product.

79. The method of claim 78, wherein the battery electrode is an anode.

80. The method of claim 79, wherein the battery is a lithium ion or a sodium ion battery.

81. The method of claim 78, wherein the battery is a lithium ion battery or a sodium ion battery.

82. A method of making a battery electrode comprising carbon black, the method comprising the steps of:
providing a carbonaceous source material containing carbon black;
contacting the carbonaceous source material with an oleum bath to produce a sulfonated material;
pyrolyzing the sulfonated material to produce a carbon black product comprising a glassy carbon matrix phase having carbon black dispersed therein;
wherein the carbon black product is further surface activated and the carbon black product has an average pore size between 1 and 20 nm and a density of the pores having an average pore size between 1 and 20 nm is increased; and,
forming a battery electrode from the carbon black containing product.

83. The method of claim 82, wherein the battery electrode is an anode.

84. The method of claim 83, wherein the battery is a lithium ion or a sodium ion battery.

85. The method of claim 82, wherein the battery is a lithium ion battery or a sodium ion battery.

86. A method of making a battery electrode comprising carbon black, the method comprising the steps of:
providing a carbonaceous source material containing carbon black;
contacting the carbonaceous source material with an oleum bath to produce a sulfonated material;
pyrolyzing the sulfonated material to produce a carbon black product comprising a glassy carbon matrix phase having carbon black dispersed therein;
wherein the carbon black containing product has a specific surface area of less than 100 $m^2/g$; and,
forming a battery electrode from the carbon black containing product.

87. The method of claim 86, wherein the battery electrode is an anode.

88. The method of claim 87, wherein the battery is a lithium ion or a sodium ion battery.

89. The method of claim 86, wherein the battery is a lithium ion battery or a sodium ion battery.

* * * * *